United States Patent [19]

Nugier

[11] Patent Number: 4,653,324
[45] Date of Patent: Mar. 31, 1987

[54] DYNAMIC BALANCING MACHINE

[75] Inventor: John G. Nugier, Burns, Tenn.

[73] Assignee: Rockwell International Corporation, Pittsburgh, Pa.

[21] Appl. No.: 765,990

[22] Filed: Aug. 15, 1985

[51] Int. Cl.$^4$ ............................................. G01M 1/02
[52] U.S. Cl. ....................................... 73/460; 73/475
[58] Field of Search ................ 73/460, 475, 476, 479, 73/477, 478, 465

[56] References Cited

U.S. PATENT DOCUMENTS

| | | | |
|---|---|---|---|
| 1,262,999 | 4/1918 | Swift, Jr. et al. | 73/479 |
| 1,876,523 | 9/1932 | Stephenson | 73/476 |
| 2,329,835 | 9/1943 | Hope et al. | 73/475 |
| 3,758,098 | 9/1973 | Vrilakas | 269/55 |
| 4,406,164 | 9/1983 | Hines et al. | 73/476 |

Primary Examiner—Stewart J. Levy
Assistant Examiner—Scott M. Oldham

[57] ABSTRACT

Machine for rapidly rotating and sensing imbalance of automotive drive shafts. Spindles including independent vibration sensors are rigidly secured to mounting blocks seated on a pair of rails integrally cast in a horizontal surface of a concrete base. A gear engaging a rack seated in a recess cast in the same horizontal surface senses to move one of the mounting blocks and its spindle and a plug also operable in the recess selectively locks the mounting block in position. Visual indicators are provided for simultaneously displaying vibrations sensed at each end of the driveshaft.

5 Claims, 11 Drawing Figures

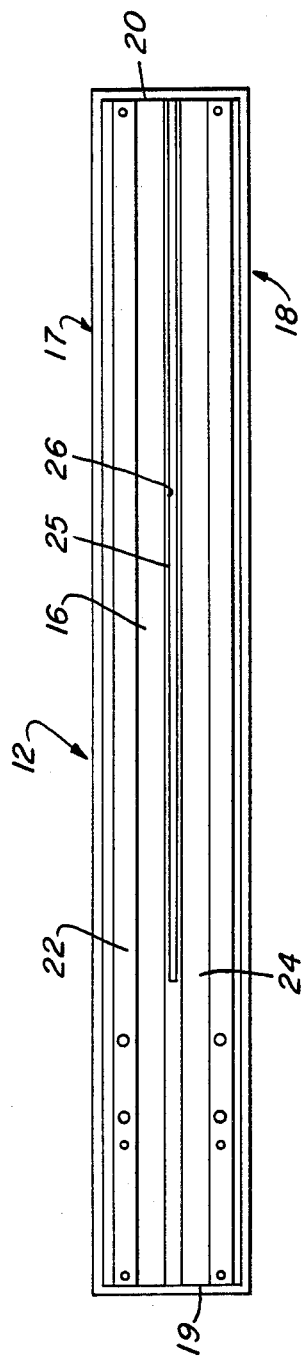
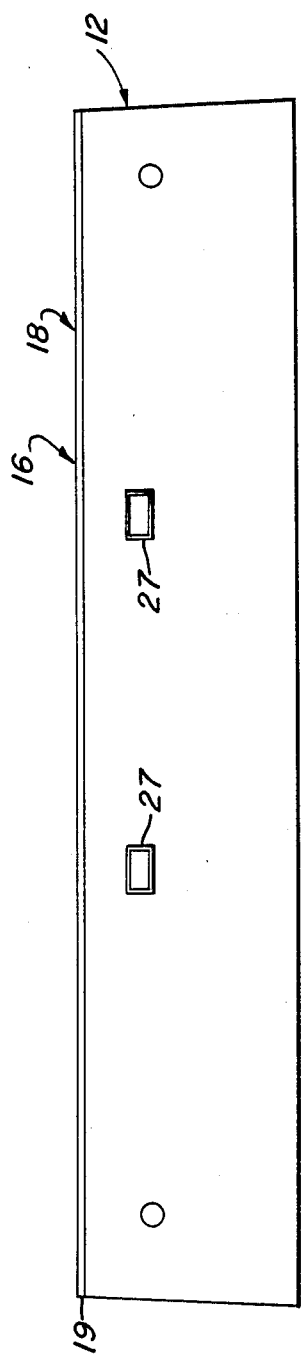
FIG. 3
FIG. 2

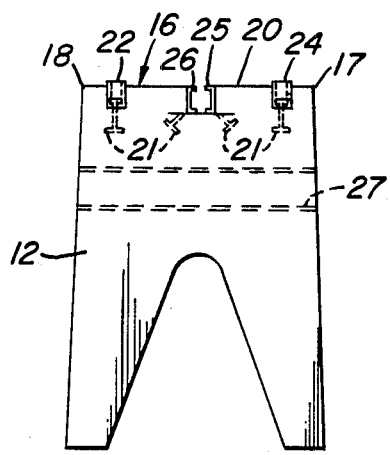
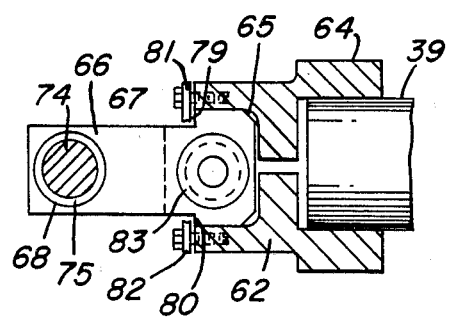
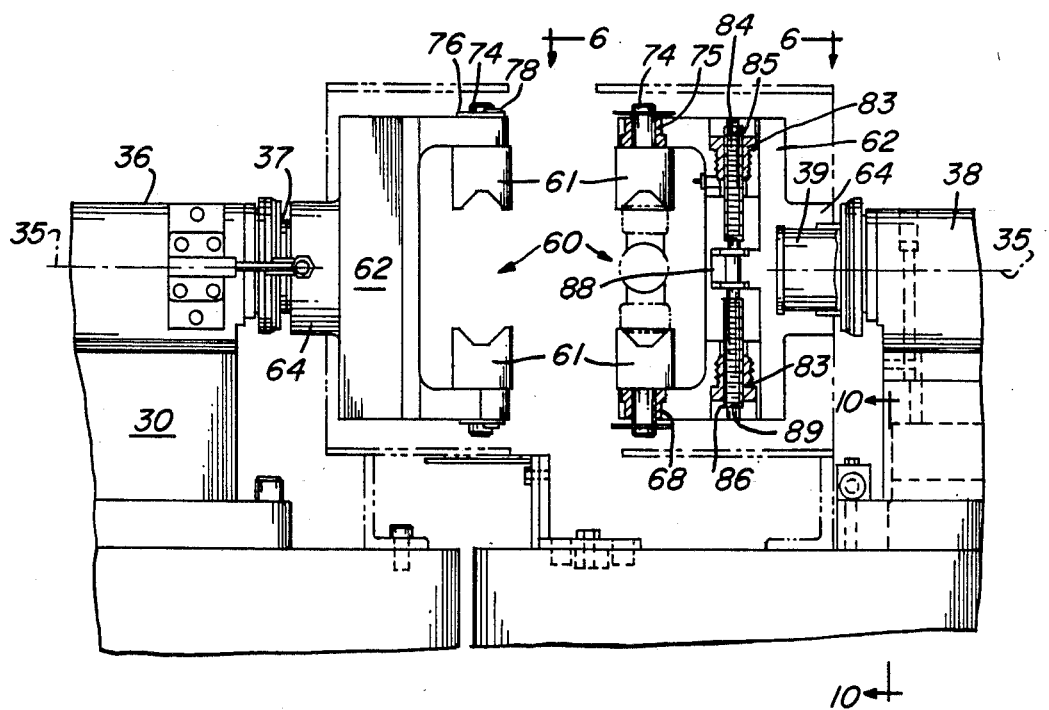

DYNAMIC BALANCING MACHINE

BACKGROUND OF THE INVENTION

1. Field of the Invention

The present invention is directed to apparatus useful in the manufacture and repair of tubular products and, more specifically, to apparatus for dynamically balancing articles of substantial axial length such as automotive drive shafts.

Automotive drive shafts sometimes referred to as drive lines are comprised of a tubular member having an element such as a yoke of a universal joint, a bearing stub or one component of a slip joint fitted and welded at each end thereof.

In automotive applications, drive shafts are utilized, either singularly or in combination, as a torque transmitting component(s) of the power train and are most commonly located under the vehicle between the transmission or other gear box and the differential of a drive axle. The ends of the drive shaft are usually connected to other components of the power train by a yoke which is fitted to one end of the drive shaft and connected by means of a universal joint cross shaped journal to another yoke receiving or delivering torque from or to an adjacent component of the power train.

Torque transmitting drive shafts of this type, especially when employed on commercial vehicles and heavy duty trucks, are subject to sudden changes in torque and exposed to road hazards which, during the life of the vehicle, may cause wear or damage to the drive shaft. In the event of such wear or damage, the drive shaft may be removed and replaced in its entirely which is rather expensive. Depending upon the nature of the wear and/or damage incurred, the drive shafts may also be disassembled and repaired which is less expensive than replacing the unit, however, this option depends upon the availability of equipment necessary to disassemble and reassemble the drive shaft assembly and to balance the reassembled drive shaft and thereby avoid undesirable vibration and wear.

2. Description of the Prior Art

Various types of balancing machinery and equipment have been employed to balance drive shafts in the past. Most of these are relatively long machines having spaced spindles adapted to engage and rapidly rotate the opposite ends of a drive shaft and sensors or other devices for detecting and indicating vibration(s) induced by the rapidly rotating driveshaft. Some machines have utilized heavy cast and/or fabricated frames supporting the spindles while others have utilized cast concrete bases. However, those dynamic balancing machines which have previously utilized cast concrete bases have also used soft or resilient mounting devices for the spindles and detect imbalance at only one end of the drive.

The present invention provides a dynamic balancing machine in which the spindles are rigidly mounted to the base and enable the machine to effect a truer indication of imbalance since there are no resilient spindle mounting devices to dampen vibrations at the ends of the drive shaft. The machine also provides for simultaneous sensing and indication of vibration at each end of the drive shaft and facilitate rapid changes in the axially movable spindle as well as the attachment of the drive shaft to the spindle chuck.

SUMMARY OF THE INVENTION

The present invention provides a dynamic balancing machine of the type which includes a pair of spaced spindles for rotating articles of substantial axial length, a concrete base having an elongate horizontal bed bounded by longitudinally extending edges and spaced ends, a pair of rails cast in the bed in spaced parallel relation to the edges, a fixed mounting block secured adjacent one end of the bed and a second mounting block spaced from the fixed mounting block and mounted for sliding movement on the rails. Means are provided for moving the second mounting block on the rails toward and away from the fixed mounting block and additional means are provided for selectively locking the second mounting block against movement on the rails. The first and second spindles are respectively rigidly fixed to the fixed mounting block and the second mounting block. Each spindle rotatably mounts a shaft for rotation around a common axis and means are provided for rotating the shaft of at least one of the spindles and for securing the axially spaced ends of an article for rotation with the shafts of the spindles. The fixed mounting block is also preferably secured to the rails. Sensing means are associated with each spindle for simultaneously sensing vibration at each spindle and means are provided for simultaneously displaying the vibration sensed at each spindle.

In the preferred embodiment, a gear and rack provide means for moving the second mounting block on the rails. The rack is preferably mounted to the base of a groove cast in the horizontal bed of the concrete base and preferably a slotted rectangular metal tube is cast in the bed and the rack is mounted to an internal wall of the tube opposite from the slotted wall. The slotted wall permits entry of the gear for engagement with the tube rack and also provides longitudinally extending internally disposed shoulders located for abutment by additional means internal of the rectangular tube which serve to lock the second mounting block against movement of the rails.

These and other features and advantages of the invention will become apparent from the following detailed description of the embodiment shown by the accompanying drawings.

BRIEF DESCRIPTION OF THE DRAWINGS

In the drawings, wherein like reference numerals refer to like parts,

FIG. 2 is a front elevation of the cast concrete base of the machine;

FIG. 3 is a plan view of the cast concrete base of the machine;

FIG. 4 is a side elevation of the case concrete base of the machine as viewed from the right side of FIG. 2;

FIG. 5 is an enlarged view, partly in section showing the spindles and associates chucks of the balancing machine;

FIG. 6 is a view taken along the lines 6—6 of FIG. 5;

DESCRIPTION OF THE PREFERRED EMBODIMENT

Figure 1:
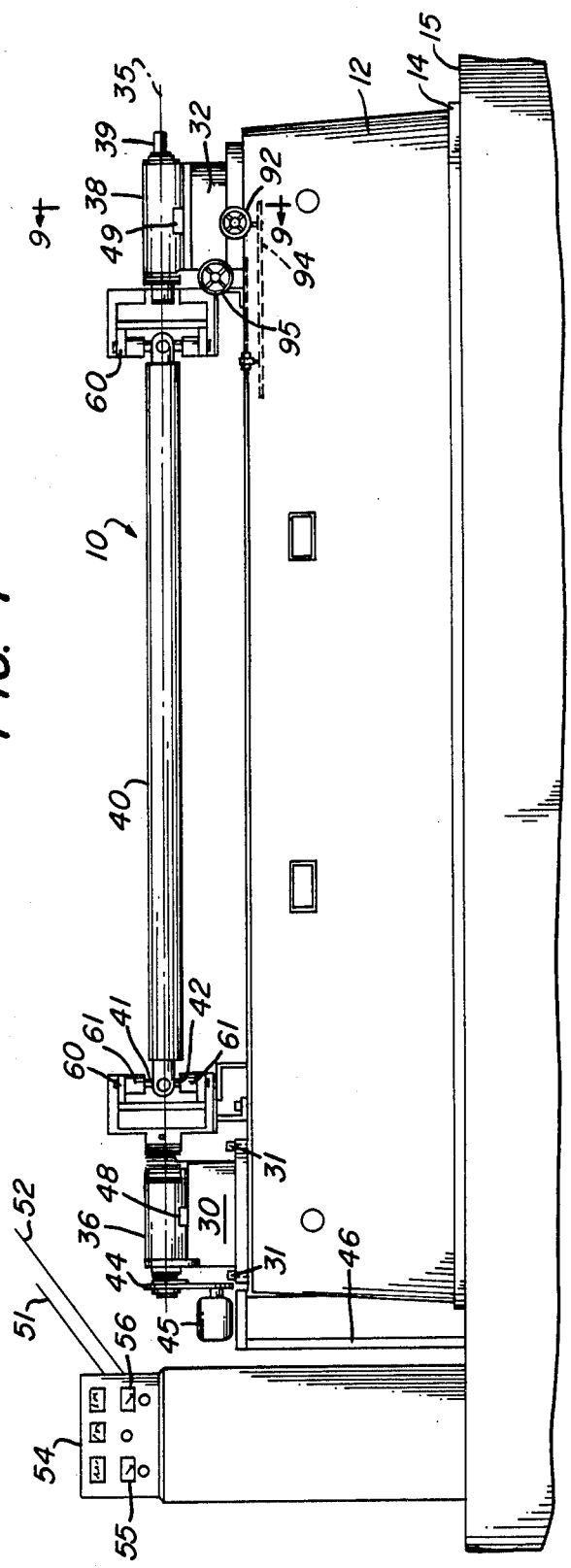
FIG. 1 is a front view showing the dynamic balancing machine of the present invention.

With reference to the drawings, FIG. 1 shows a dynamic balancing machine generally denoted by the reference numeral 10 which includes a cast concrete base 12. The cast concrete base 12 is set on a previously prepared footer or foundation pad 14 provided on the machine floor 15. The upper surface of the foundation pad 14 provides a level surface for the dynamic balancing machine 10. The cast concrete base 12 provides an elongate horizontal bed 16 bounded by longitudinally extending edges 17 and 18 and spaced ends 19 and 20.

A pair of rails 22 and 24 are cast integrally with the concrete base and extend substantially the entire length of the support bed 16 parallel to the longitudinal edges 17 and 18. A rectangular metal tube 25 is also cast integral with the support bed 16. The rectangular metal tube 25 also extends substantially the entire length of the support bed 16 and is parallel to the longitudinal edges 17 and 18. The exposed outer wall of the rectangular metal tube is slotted at 26 along a substantial length of the tube 25 for purposes which will be described more fully hereinbelow.

The rails 22 and 24 and the rectangular metal tube 25 are each provided with a plurality of anchors 21 secured by welding at various locations along the length of the rails and tube which extend into and firmly secure the rails 22 and 24 and the rectangular metal tube 25 to the surrounding concrete mass.

A pair of 3"×6" rectangular steel tubes 27 are also cast in the concrete base to provide lateral support for means such as the fork of a lift truck or crane utilized to move or maneuver the concrete base 12.

A mounting block 30 is secured by means of machine screws 31 to the rails 22 and 24 adjacent the end 19 of the horizontal support bed 16. A second mounting block 32 located adjacent the end 20 of the support bed 16 is slidable along the rails 22 and 24 toward and away from the fixed mounting 31. The mounting block 30 and 32 provide support for spindles 36 and 38 which are rigidly secured to the mounting blocks 30 and 32. The spindles 36 and 48 respectively rotatably mount shafts 37 and 39 for rotation about a common horizontal axis 35. The spindle shafts 37 and 39 each respectively mount a two-jaw chuck assembly 50 especially adapted for engaging the oppositely disposed journal end of a universal joint cross provided at each end of an elongate tubular element such as a drive shaft 40 for rapid rotation and detection of any imbalance therein.

One end of the shaft 37 of spindle 36 is provided with a belt driven sheave 44 driven by a motor mounted to a support 46 provided to the rear of the left end of the dynamic balancing machine 10 as shown by FIG. 1. Vibration sensing elements 48 and 49 respectively provided to the spindles 36 and 38 emit electrical signals which are respectively carried by lead wires 51 and 52 to visual indicating devices 55 and 56 provided to a console 54 located adjacent the motor 45. During operations of the machine 10, the sensors 48 and 49 simultaneously detect vibrations induced by imbalance of the drive shaft 40 at the spindles 36 and 38, i.e., at each end of the drive shaft 40 and transmit electrical pulses along the wires 51 and 52 to simultaneously provide a visual indication of such imbalance at the indicating devices 55 and 56.

The two jaw chuck assemblies 60 each comprise a pair of jaw elements mounted for reciprocating or sliding movement on a bracket 62 having a hub 64 secured for rotation with the spindle shaft 37 or 39.

The jaw elements 61 are each carried by a sliding out 66 for reciprocating movement on the radially extending brackets 62.

Figure 7:
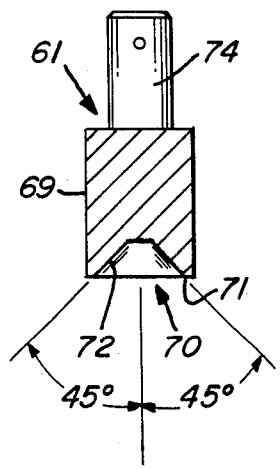
FIG. 7 is a view partly in section showing details of one of the jaw elements of the two-jaw chucks associated with each of the spindles of FIG. 5.
Figure 8:
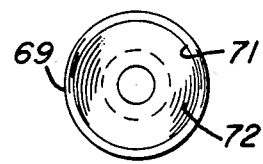
FIG. 8 is a view looking into the recessed aperture of the jaw element of FIG. 7.
Figure 11:
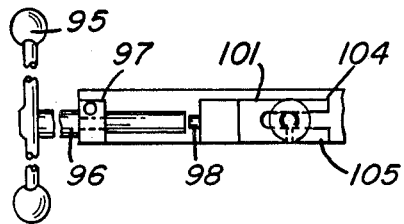
FIG. 11 is a plan view apparatus shown by FIG. 10.
Figure 10:
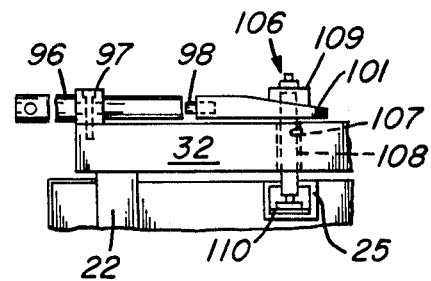
FIG. 10 is a view taken along line 10—10 of FIG. 5.
Figure 9:
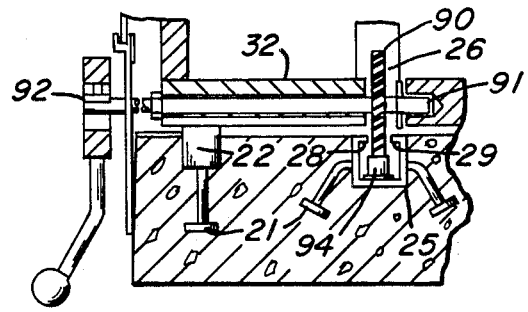
FIG. 9 taken along section 9—9 of FIG. 1.

Each jaw element 61, as shown by FIGS. 7 and 8, is comprised of a cylindrical body 69 having an article receiving recess 70 at one end thereof and a shank 74 coaxial with and extending from the other end of the cylindrical body portion 69. The recess 70 of each jaw elements 61 has a circular opening or mouth 71 and an interior uniformly converging article engaging surface 72. The jaw elements 61 are preferably formed having a recess mouth opening 71 of 1½ inch in diameter and an interior converging article engaging surface 72 in the form of a frusto-conical surface having a slope of 45°. The article engaging the surface 72 of the recess 70 thus converges to a diameter of approximately ½ inch, ½ inch in from the circular mouth opening 71. The article engaging recess surface 72 is thus adapted to receive the cylindrical end of universal joint cross journals having a diameter ranging from ½" up to 1½". Vertical spacing of the jaw elements 61 in each chuck assembly 60 can be adjusted to accommodate different lengths between the ends of such universal cross journals within the limits of the mechanism to be described hereinbelow. Additional jaw elements identical to the jaw elements 61 being of slightly different length may also be utilized in the two jaw chuck assemblies. It has been found that two sets of jaw elements 61 having cylindrical body lengths of 2½" and 4" will accommodate substantially all universal joint cross configurations encountered during normal repair and rebuilding service.

The shank 74 of each jaw element 61 is positioned in a bushing 75 seated in a bore 68 provided at one end of the sliding nut 66. The end of the shank 64 is secured by means of a washer 76 and cotter key 78. The other end of the sliding nut 66 is disposed for radially reciprocating movement in a way 65 provided to the radially extending bracket 62. The sliding nut 66 is provided with a pair of shoulders 79 and 80 retained within the way 65 by means of a pair of elongate retaining plates 81 and 82 bolted to the bracket 62. Each of the sliding nuts 66 are bored and countersunk at 67 and receive a threaded nut 83. The two nuts of each chuck assembly 60 are engaged with a shaft 84 rotatably journaled in a bushing 88. The shaft 84 is oppositely threaded at its respective ends 85 and 86 and one end of the shaft is provided with a square head 89. The shaft 84 may thus be rotated by means of a wrench engaging the square head 89. Clockwise rotation of the shaft 84 will cause the oppositely disposed nuts to move toward the bushing 88 and bring the jaw elements 61 closer to the horizontal axis 35. Counter clockwise rotation of the shaft 84 will move the threaded nut 83 and their associated jaw elements 61 away from the horizontal axis 35.

The mounting block 32 may be moved toward and away from the fixed mounting block 30 to accommodate drive shafts of different axial lengths. A gear and rack mechanism are provided to accommodate such movement. A spur gear 90 is fixed to a shaft 91 journaled in the base of the second mounting block 32. The hand wheel 92 is fixed to an extending end of shaft 91 and provides means for rotating the spur gear 90. A rack 94 is secured to the internal wall of the rectangular metal tube 25 opposite from the slot 26. The slot 26 permits entry of a segment of the spur gear 90 and the teeth of the spur gear 90 engage the teeth provided to the rack 94. Rotation of the hand wheel 92 permits movement of the second mounting block 32 and the spindle 38 carried thereby along a substantial length as indicated by the length of the slot 26 provided to the rectangular metal tube 25 as shown by FIG. 3.

The second mounting block 32 may also be locked in a selected location along the rails 22 and 24 by actuation of a second hand wheel 95. The hand wheel 95 is secured to a shaft 96 mounted for rotation in a bushing 77 and having a power screw 98 secured at the end thereof. The power screw 98 is internally threaded to a sliding wedge 101. The sliding wedge 101 is bifurcated at 104 and 105 to raise and lower a locking shaft assembly 106. The locking shaft assembly 106 is comprised of a shaft 108 passing through a vertical bore 107 provided to the second mounting block 32 and having a wedge shaped nut 109 at one end thereof and a stepped bushing 110 located internally of the rectangular metal tube 25. The shaft 108 passes through the slot 26 provided to the rectangular metal tube 25 and the stepped bushing is of sufficient width at the upper surfaces thereof are adapted to engage the shoulders 28 and 29 provided adjacent the slot 26 when the locking shaft assembly 106 is raised by rotating the handwheel 96 and power screw 98 to advance the bifurcated sliding wedge 101 thereby raising the wedge shaped nut 109 and the shaft assembly 106 and the stepped bushing 110 into abutment with the metal tube shoulders 28 and 29. The locking assembly is released by rotating the handwheel 95 in the opposite direction to withdraw the bifurcated sliding wedge 101.

The invention may also be embodied in other specific forms without departing from the spirit or essential characteristics thereof. The foregoing description is therefore to be considered as illustrative and not restrictive, the scope of the invention being defined by the appended claims, and all changes which come within the meaning and range of equivalency of the claims are therefore intended to be embraced thereby.

I claim:

1. A dynamic balancing machine of the type which includes a pair of spaced spindles for rotating articles of substantial axial length comprising:
   a concrete base having an elongate horizontal bed bounded by longitudinally extending edges and spaced ends,
   a pair of rails cast in said bed in spaced parallel relation to said longitudinally extending edges, said rails extending the entire length of said longitudinally extending edges, and anchors connected to said rails and cast into the concrete base,
   a fixed mounting block secured to said rails adjacent one end of said bed,
   a second mounting block spaced from said fixed mounting block and mounted for sliding movement on said rails, wherein said concrete base is cast with a groove extending parallel to said longitudinally extending edges and a rack having teeth secured to said bed in said groove,
   means for moving said second mounting block on said rails toward and away from said fixed mounting block, wherein said means for moving said second mounting block on said rails comprises a gear mounted for rotation on said second mounting block and engaging the teeth of the rack secured to said bed,
   locking means including means partially closing said groove mounting said rack and means operable against said means partially closing said groove mounting said rack for selectively locking said second mounting block against movement on said rails,
   first and second spindles respectively rigidly fixed to said fixed mounting block and said second mounting block,
   each said spindle rotatably mounting a shaft for rotation around a common horizontal axis,
   means for rotating the shaft of one of said spindles, and
   means for securing the axially spaced ends of an article for rotation with the shafts of said spindles, and
   sensing means associated with each spindle for simultaneously sensing vibration at each said spindle and means for simultaneously displaying the vibration sensed at each said spindle.

2. The apparatus defined by claim 1 wherein said rack is mounted on an undercut recess partially defined by a pair of internally disposed shoulders extending longitudinally at each side of the recess opening and wherein said locking means is located in said recess and movable into abutment with said shoulders for locking said second mounting block against movement on said rails.

3. The apparatus defined by claim 2 including a rectangular metal tube seated within the groove cast in said bed and one wall of said tube is slotted along a substantial length thereof to permit entry of said gear and to provide the pair of internal shoulders with one shoulder on each side of said slot.

4. The apparatus defined by claim 1 wherein a rectangular metal tube is cast in said groove in said horizontal bed, said tube is parallel to said rails, an exposed wall of said tube is slotted along a substantial length thereof to permit entry of said gear and said rack is secured to an internal wall of said tube opposite from said slotted wall.

5. A dynamic balancing machine of the type which includes a pair of spaced spindles for rotating articles of substantial axial length comprising:
   a concrete base having an elongate horizontal bed bounded by longitudinally extending edges and spaced ends,
   a pair of rails cast in said bed in spaced parallel relation to said longitudinally extending edges,
   a fixed mounting block secured adjacent one end of said bed,
   a second mounting block spaced from said fixed mounting block and mounted for sliding movement on said rails,
   a longitudinal rectangular metal tube cast in said horizontal bed of the concrete base between and parallel to said rails, and having an upward opening slot through an exposed wall of said tube and extending a substantial length of said tube,
   plural anchors extending outward from the rails and the metal tube and cast into the concrete base for anchoring the rails and the longitudinal metal tube,
   a rack secured internally in said tube on a lower wall thereof opposite from said upward opening slot in the exposed wall, the rack having upwardly facing teeth, a gear mounted for rotation on said second mounting block and extending into the tube and having teeth engaging the teeth of said rack, means for rotating said gear to move said second mounting block on said rails toward and away from said fixed mounting block, means operable against the internal surfaces of said exposed wall of said tube adjacent said slot for selectively locking said second mounting block against movement on said rails, first and second spindles respectively rigidly fixed to said fixed mounting block and said second mounting block, each said spindle rotatably mounting a shaft for rotation around a common horizontal axis, means for rotating the shaft of one of said spindles, and means for securing the axially spaced ends of an article for rotation with the shafts of said spindles, and sensing means associated with each spindle for simultaneously sensing vibration at each said spindle and means for simultaneously displaying the vibration sensed at each said spindle.

* * * * *